Figures 1, 2, 3:
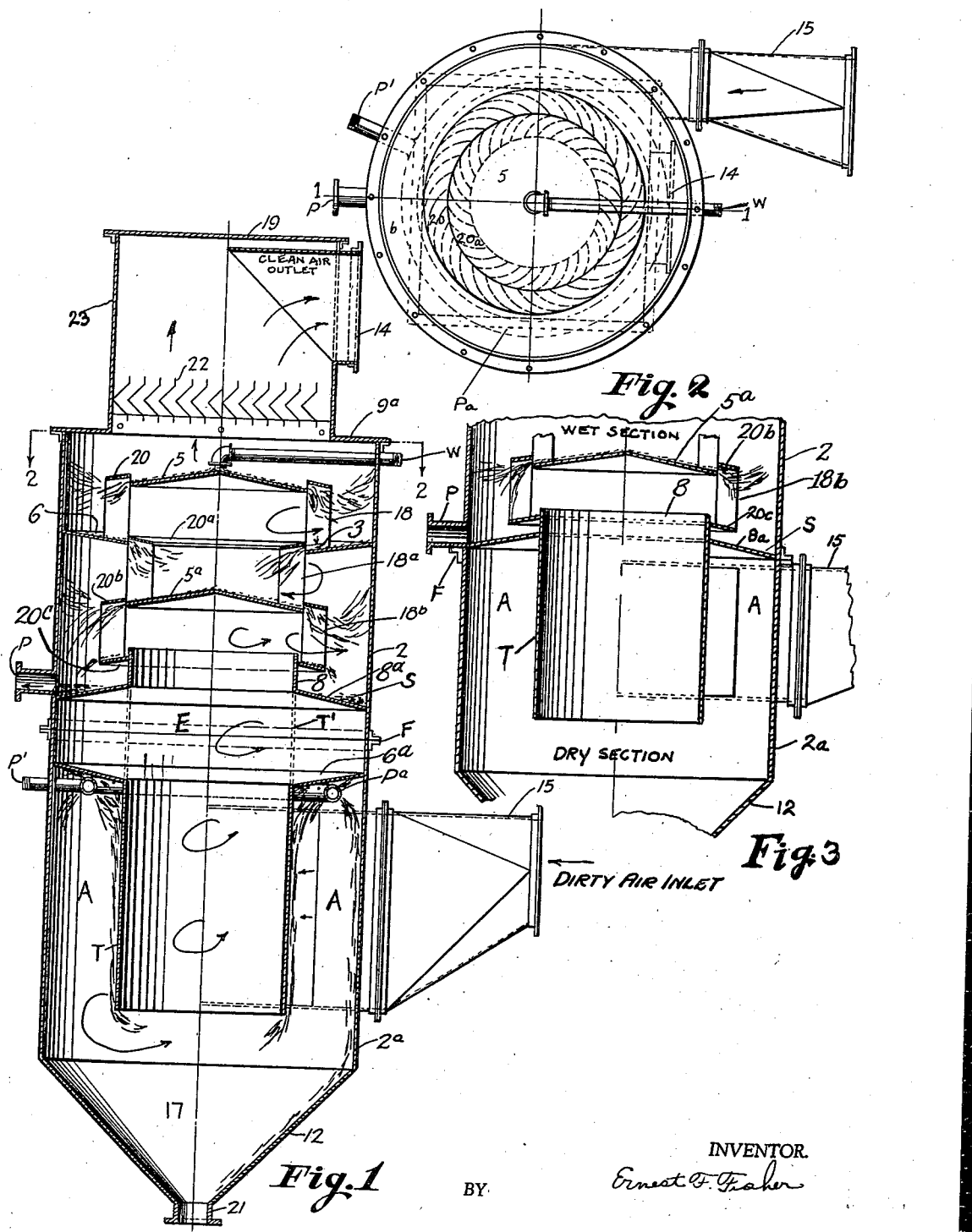

Oct. 14, 1941.  E. F. FISHER  2,259,034

GAS WASHER

Filed March 6, 1939

INVENTOR.
Ernest F. Fisher

BY

ATTORNEY.

Patented Oct. 14, 1941

2,259,034

UNITED STATES PATENT OFFICE 2,259,034

GAS WASHER

Ernest F. Fisher, Boston, Mass.

Application March 6, 1939, Serial No. 260,031

2 Claims. (Cl. 183—28)

This invention relates to improvements in columns for the treatment of gases or vapors with water, oil or other liquids for the purpose of removing dust, impurities and other solids from the gases or vapor, wherein the effect is attained by the scrubbing action of water or other liquid under the influence of the gas or vapor travelling at high speed, whereby the particles or impurities are caused to impinge on wetted surfaces located in the path of the moving gas or vapor.

The invention consists in the novel features of construction more fully set forth in the specification and pointed out in the claims.

The principal object of my invention is to overcome the difficulty inherent in wetting some fine dusts of microscopic size in that these dusts are water repellant and not easily wetted by water which is commonly used as a contact agent. Therefore, I propose to use oil or some other suitable liquid which has the property of wetting such dusts more readily, and using a cheap liquid such as water for wetting the coarser and heavier easily wetted particles. The oil or other liquid that I propose to use to wet the more water repellant fine dust particles, being comparatively costly, makes it desirable to recirculate this liquid and not mix it with the cheaper liquid for wetting the heavier particles, or to keep the heavier particles dry if it is desired to use only the more costly contact liquid or only one liquid.

Another object of my invention is to more effectively wet the blades or vanes through which the dust laden air swirls and against which the dust particles impinge and to more effectively wet and wash the walls of the enclosing casing and cooperating baffles so that particles of dust that impinge thereon may be washed off and the surfaces kept clean and the dust washed down with the downcoming liquid.

A further object of my invention is to provide a combination of wet and dry dust collector in one and the same apparatus of very simple construction so that very little change in the structure is required to operate the collector as a wholly wet collector using two separate contact liquids or as a wet and dry collector combined wherein the bulk of the dust is collected dry in the bottom portion of the column and the fine nuisance dust is collected in the upper portion of the column as a sludge in a disposable form.

Other advantages of my invention will be better apparent from a detailed description in connection with the accompanying drawing in which Figure 1 is a vertical cross section of the apparatus taken on line 1—1 of Figure 2. Figure 2 is a plan section taken on line 2—2 of Figure 1 and shows the dirty air inlet 15 and also in plan view the baffle disc 5, blade ring 20, baffle ring 6, liquid supply pipe W and water distributing ring Pa which is dotted.

Figure 3 is a vertical section of a modified form of the apparatus.

The column casing is divided into two sections, 2 and 2a which are joined together by the flanges F. The lower section 2a is provided with a tangential air or gas inlet 15 and has a conical hopper bottom 12 provided with an outlet 21 for either sludge or dry dust. The lower section 2a has at the top a downwardly inclined baffle 6a with a central orifice from which extends downwardly an axial tube T which is adjacent the inlet 15. The tube T does not extend all the way down but the lower end is spaced above the conical bottom 12 so as to provide space for the swirling air to enter the tube without restriction. The lower end 2a of the column is in effect a true cyclone collector. Under the baffle 6a is positioned the liquid supply pipe ring Pa supplied with liquid through connecting pipe P1, and provided with a series of holes as shown from which water or other liquid is distributed to the annular space A—A beneath. This annular space is formed by the axial tube T and the wall of casing 2a. The upper section 2 is provided with a series of vanes, 18, 18a and 18b, baffles 5, 5a, 6 and 8a and blade rings 20, 20a, 20b and 20c. The baffle 8a with the vertical ring 8 provides an annular trough S for catching liquid discharged over the baffle disc 5 by supply pipe W. The liquid and entrained dust is discharged from this annular trough through discharge pipe P.

The top section 2 is surmounted by the outlet chamber 23 which is bolted to the top section through flange 9a. This outlet chamber is provided with a clean air outlet 14, spray eliminator plates 22 and cover 19.

In operation dust laden air or gases to be treated and cleaned enters the lower section 2a through the tangential inlet 15. The air swirls around the annular space A—A and throws the water falling from the holes in pipe ring Pa, against the inner wall of chamber 2a and against the outer wall of axial tube T, copiously wetting these surfaces against which the heavy dust impinges. This dust is washed down as a sludge into conical hopper 12. The air with the remaining fine dust continues to swirl spirally and enters the lower end of tube T. Continuing its spiral swirl upward through the tube T, it enters the expansion chamber E where any entrained moisture is thrown out due to centrifugal force. The expansion chamber E is located between baffle plates 8a and 6a. Continuing its spiral swirl upward through the annular ring 8, the air is guided outwardly toward the wall of chamber 2 by the curved vanes 18b which are attached to blade ring 20c which in turn is attached to vertical ring 8 of trough S, vertical ring 8 and baffle 8a together with wall of casing 2 forming the annular trough S. The vanes or blades 18b are attached at their upper ends to baffle or blade ring 20b which is spaced above baffle disc 5a so that liquid which falls off of the edge of baffle disc 5a may run under ring 20b and fall directly into the path of the air flowing through the blades, and be thrown against the blades 18b and the adjacent wall of chamber 2 thus wetting these surfaces against which dust impinges as in my co-pending application Ser. No. 256,522 filed Feb. 15, 1939.

The air continues its spiral swirl upward and is guided inwardly by the blades 18a and throws the sheet of water inwardly that falls off of edge of ring 6 through the clearance 3 between blade ring 20a and ring baffle 6 thus depositing this water on top of baffle disc 5a. The air continues to spiral upward and is guided outwardly toward wall of casing 2 by blades 18, carrying with it the water that falls off of edge of topmost baffle disc 5 and copiously wetting the blades 18 and adjacent wall of chamber 2 against which any remaining fine dust impinges. The cleaned air continues upward through the spray eliminator plates 22 which remove any entrained liquid, and through the outlet chamber 23 and the clean air outlet 14. The pipe W supplies liquid to the uppermost baffle disc 5.

It will be noted that the lowermost blades 18b are set away from the outer wall of vertical ring 8 of trough S so as to drain all liquid into annular trough S and to prevent any liquid that runs down the vanes 18b from getting into expansion chamber E and thence down into lower chamber 2a. The fine dust that impinges on the wetted surfaces in upper chamber 2 is deposited as sludge in the annular trough S and removed through discharge pipe P.

Figure 3 shows a modified form of my wet dust collector when it is desired to collect the bulk of the dust dry and the remaining fine nuisance dust wet with a liquid that will not effect the humidity of the outgoing cleaned air. This is especially important where it is desired to re-circulate the cleaned air into a room.

In my wet-dray collector shown in Figure 3, the vertical ring baffle 8 which forms a wall of the annular trough S, is a continuation shown dotted of the axial tube T in Figure 1. The expansion chamber E and the liquid distributing pipe Pa are eliminated. The remaining part of the wet-dry collector is the same as in Figures 1 and 2.

In operation the dust laden air enters the conical hoppered bottom section 2a through the tangential inlet 15. The air swirls around the annular space A—A and deposits the coarser and some fine dust against the wall of chamber 2a by centrifugal force. This dust settles in conical hopper 12 and is discharged dry through the outlet 21 as in Figure 1. The air continues swirling and spirals upward through the axial tube T and is guided outwardly toward the wall 2 by the vanes 18b, carrying through the blades the liquid that falls off of the outer edge of baffle disc 5a and copiously wetting the blade surfaces and the adjacent wall of casing 2 against which fine dust impinges and the dust is washed down into sludge trough S precisely as in Figure 1 and then drained out through pipe P. The air continues as in Figure 1 and passes out the cleaned air outlet 14 as in Figure 1.

My wet-dry collector is particularly desirable where the usable dust collected must be kept dry and the resultant fine nuisance dust efficiently and economically suppressed. It is also desirable as pointed out above, in locations where it is necessary from considerations of economy to recirculate the cleaned air back into the room. In this case, oil is used as the contact liquid and the humidity of the cleaned air is unaffected.

Having now particularly described my invention and its manner of operation, I claim:

1. A gas cleaning apparatus comprising, in combination, a column provided with a tangential inlet at the bottom and an outlet at the top, a substantially annular trough attached to the inner wall of the column above the inlet and below the outlet, thus dividing the column into a cyclone separator in the bottom and a scrubbing chamber in the top, a substantially horizontal blade ring provided with a central opening disposed above said trough and below said outlet, a plurality of substantially vertical swirl-producing vanes circularly disposed between said trough and said blade ring, a substantially horizontal imperforate baffle disc, means to supply liquid to the upper surface of said baffle disc, said disc being disposed with its outer edge below the inner edge of said blade ring so that said liquid may drain through the opening between them while not permitting gases to pass upwardly through it.

2. Apparatus as in claim 1, in which a substantially vertical tube depends from the opening formed by said annular trough.

ERNEST F. FISHER.